US006877347B2

(12) United States Patent
Elliason

(10) Patent No.: US 6,877,347 B2
(45) **Date of Patent: *Apr. 12, 2005**

(54) REMOTE KEY TURNING TOOL AND METHOD FOR USING THE SAME

(75) Inventor: John Elliason, Raleigh, NC (US)

(73) Assignee: Universal Product Marketing, Inc., Rocky Mount, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/760,943

(22) Filed: Jan. 20, 2004

(65) Prior Publication Data

US 2004/0148986 A1 Aug. 5, 2004

Related U.S. Application Data

(63) Continuation of application No. 10/301,216, filed on Nov. 21, 2002, now Pat. No. 6,701,760.

(51) Int. Cl.[7] .......................... B60R 25/02; E05B 19/04

(52) U.S. Cl. ............................ 70/256; 70/252; 70/395; 70/408; 70/456 R; 74/500.5; 74/501.5 R; 74/501.6; 74/505; 74/506

(58) Field of Search .......................... 70/256, 395, 408, 70/456 R, 416, 429, 430, 252; 74/500.5, 501.5 R, 501.6, 505, 506

(56) References Cited

U.S. PATENT DOCUMENTS 231,506 A 8/1880 Stoddard
519,605 A 5/1894 Von Hunefeld
1,146,485 A 7/1915 Dunn
1,458,864 A 6/1923 Upton
2,591,618 A 4/1952 Schaeffer ..................... 290/37
2,627,743 A 2/1953 Ribbing
3,507,259 A 4/1970 Lankford .................... 123/179
3,875,772 A 4/1975 Ebersman et al. ............ 70/107
3,911,752 A 10/1975 Olson et al. ................ 74/10 A
3,968,669 A 7/1976 Coleman .................. 70/456 R
4,036,040 A 7/1977 Graizzaffi .................... 70/431
4,110,629 A 8/1978 Dotson et al. ............ 290/38 R
4,292,995 A * 10/1981 Mazzola .................. 137/384.2
4,660,397 A 4/1987 Girimont .................. 70/456 R
5,058,465 A * 10/1991 Womack ...................... 81/487
5,927,114 A 7/1999 Berry .......................... 70/332
5,937,704 A 8/1999 Shimizu et al. ............ 74/500.5
6,112,462 A 9/2000 Kolar .......................... 49/121
6,199,445 B1 3/2001 Valdez ...................... 74/501.6
6,266,844 B1 7/2001 Conflitti et al. .......... 15/250.25
6,396,388 B1 5/2002 Dong ........................ 340/5.62
6,701,760 B1 * 3/2004 Elliason ....................... 70/256

FOREIGN PATENT DOCUMENTS

DE 2226385 12/1973 ............... 70/456 R

* cited by examiner

*Primary Examiner*—Lloyd A. Gall
(74) *Attorney, Agent, or Firm*—Myers Bigel Sibley & Sajovec, P.A.

(57) ABSTRACT

A tool for remotely turning a key includes a key unit including an engagement assembly adapted to engage the key and an operator unit including a control assembly. At least one cable segment is provided linking the key unit and the operator unit such that the engagement assembly can be mechanically rotated via the cable segment by manipulation of the control assembly to thereby rotate the key when the key is engaged by the engagement assembly.

16 Claims, 7 Drawing Sheets

REMOTE KEY TURNING TOOL AND METHOD FOR USING THE SAME

RELATED APPLICATION(S)

The present application is a continuation of and claims priority from U.S. patent application Ser. No. 10/301,216, filed Nov. 21, 2002, now U.S. Pat. No. 6,701,760, issued Mar. 9, 2004.

FIELD OF THE INVENTION

The present invention relates to tools and, more particularly, to a tool for remotely turning a key.

BACKGROUND OF THE INVENTION

When servicing automobiles and the like, it is often necessary or desirable to turn the ignition switch of the automobile, via the ignition key, to and between the "on", "off" or "start" positions. In particular, a mechanic may wish to change the position of the ignition switch while located remotely from the ignition switch, for example, under the automobile or in or adjacent the engine bay of the automobile. Frequently, a second person is not available to operate the ignition switch or it is inconvenient or impractical for even a second person to operate the switch (e.g., the automobile is raised on a lift). Thus, the mechanic must move back and forth between the ignition switch and the area of the automobile to be serviced or observed.

SUMMARY OF THE INVENTION

According to embodiments of the present invention, a tool for remotely turning a key includes a key unit including an engagement assembly adapted to engage the key and an operator unit including a control assembly. At least one cable segment is provided linking the key unit and the operator unit such that the engagement assembly can be mechanically rotated via the cable segment by manipulation of the control assembly to thereby rotate the key when the key is engaged by the engagement assembly.

The cable segment may be pulled when the control member is operated to rotate the engagement assembly.

The key unit includes a key unit housing, the engagement assembly being rotatably mounted in the key unit housing. The operator unit includes an operator unit housing, the control assembly being mounted in the operator unit housing.

A clutch mechanism may be adapted to limit the load applied to the key by the tool.

According to method embodiments of the present invention, a method for remotely turning a key includes providing a tool including a key unit including an engagement assembly adapted to engage the key. An operator unit including a control assembly is also provided. At least one cable segment is provided linking the key unit and the operator unit such that the engagement assembly can be mechanically rotated via the cable segment by manipulation of the control assembly. The engagement assembly is mounted on the key, and thereafter the key is turned by manipulating the control assembly to mechanically rotate the engagement assembly via the cable segment.

Objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

Figure 1:
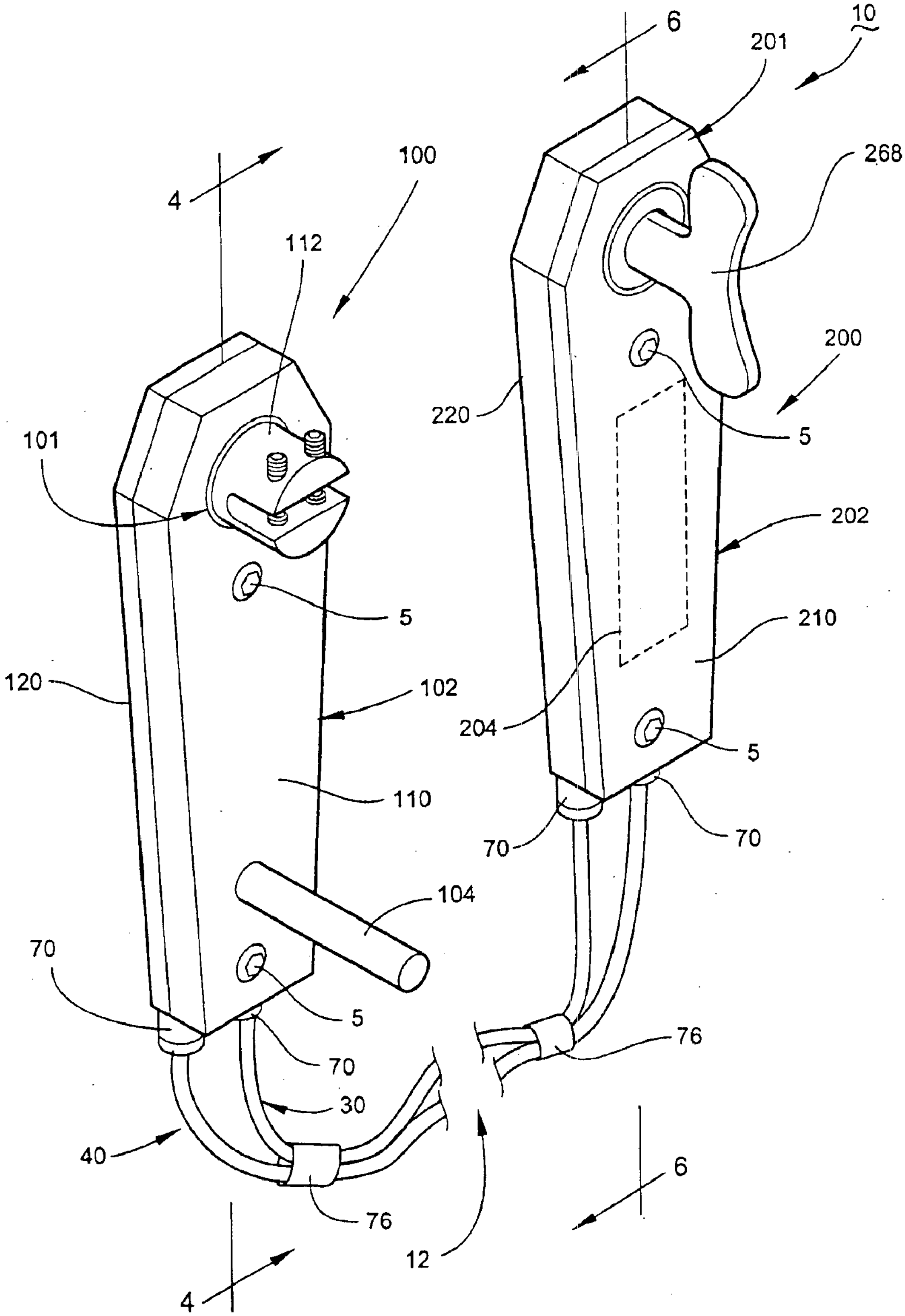
FIG. 1 is a perspective, fragmentary view of a remote key turning tool according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the relative sizes of regions may be exaggerated for clarity.

Figure 2:
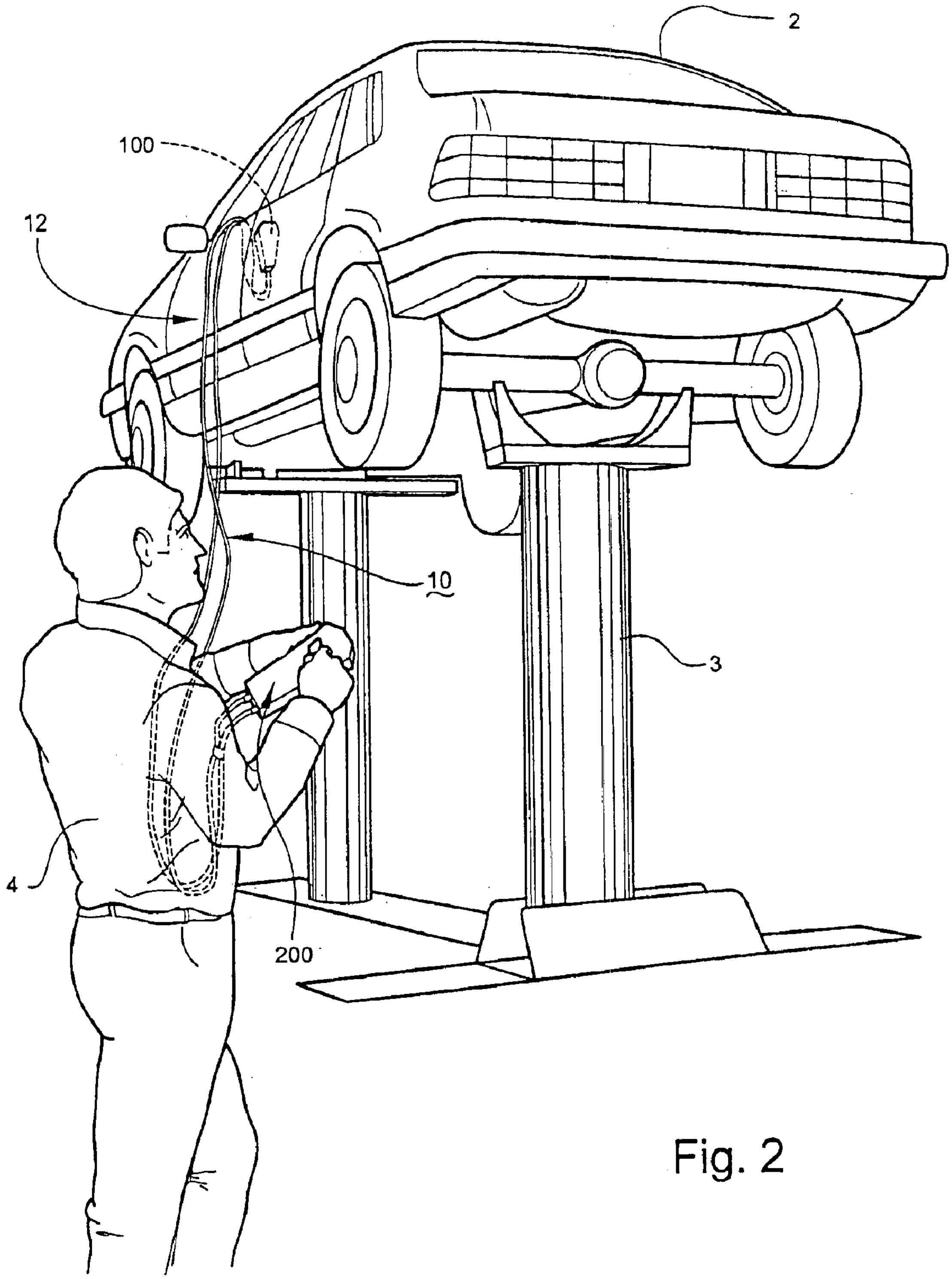
FIG. 2 is a perspective view of an operator using the tool of FIG. 1 to control the ignition switch of an automobile on a lift.

With reference to FIGS. 1 and 2, a remote key turning tool 10 according to embodiments of the present invention is shown therein. The tool 10 includes a key unit 100, an operator unit 200, and a cable system 12. The cable system 12 includes a cable assembly 30 and a cable assembly 40. The key unit 100 includes an engagement assembly 101 adapted to engage and turn an automobile key 8 (FIG. 3) or the like. The operator unit 200 includes a control assembly 201 which can be manipulated (via a knob 268) by an operator 4 to rotate the engagement assembly 101. The engagement assembly 101 and the control assembly 201 are operably linked or connected by the cable assemblies 30, 40.

Figure 3:
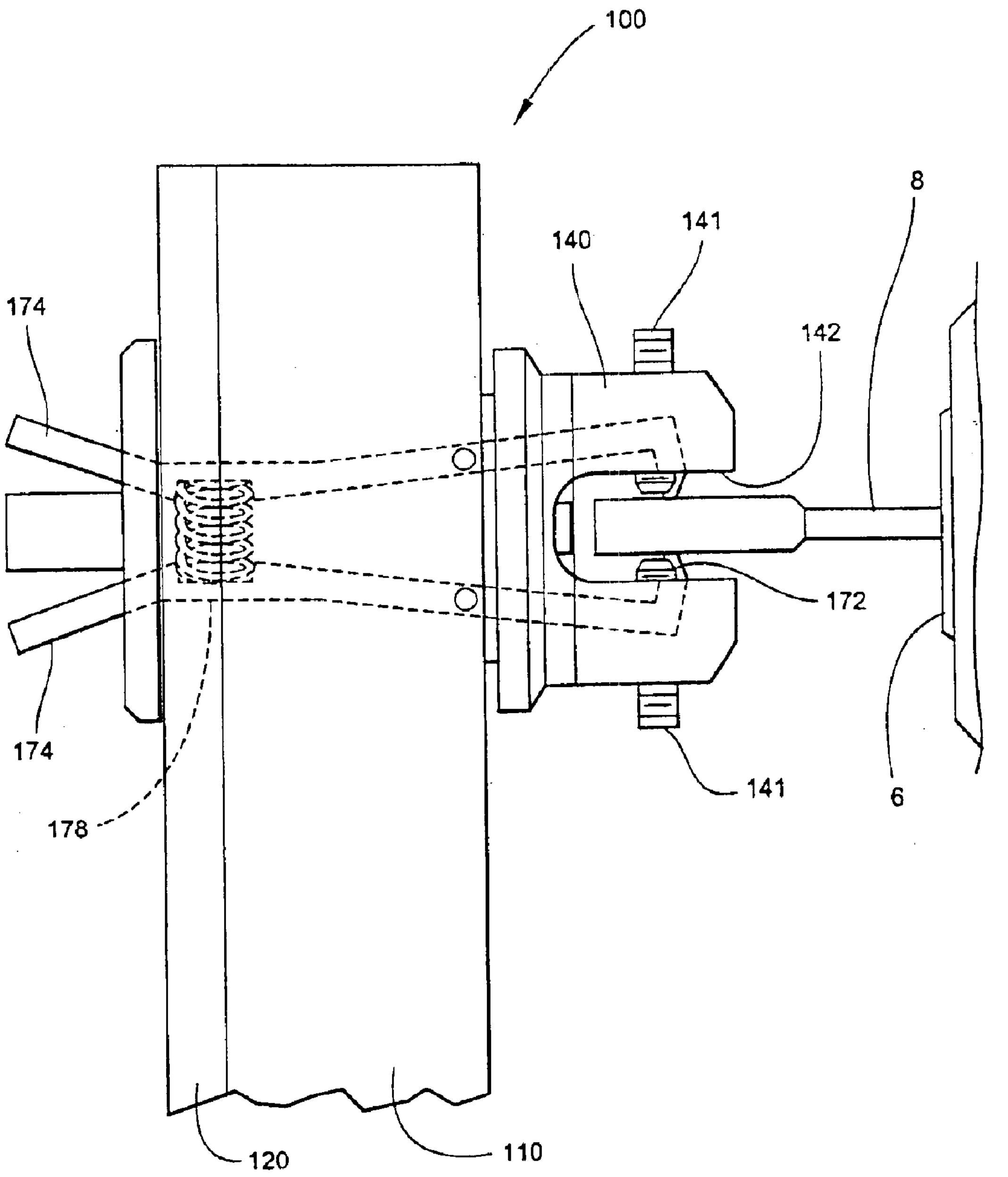
FIG. 3 is an elevational, fragmentary view of a key unit of the tool of FIG. 1 mounted on an ignition key, the key being mounted in an ignition assembly of the automobile of FIG. 2.

Referring to FIGS. 2 and 3, an exemplary use for the tool 10 is shown therein. An automobile 2 is raised on a lift 3. The key unit 100 is engaged with the key 8 of the ignition assembly 6 of the automobile 2. The operator 4 is holding the operator unit 200 below the automobile 2 and the cable system 12 extends through the window of the automobile 2. In this manner, the operator 4, while servicing or observing the underside of the automobile 2 (e.g., to repair or diagnose an undermounted fuel pump), may turn the ignition assembly 6 to the "on", "off" or "start" positions as needed.

Figure 4:
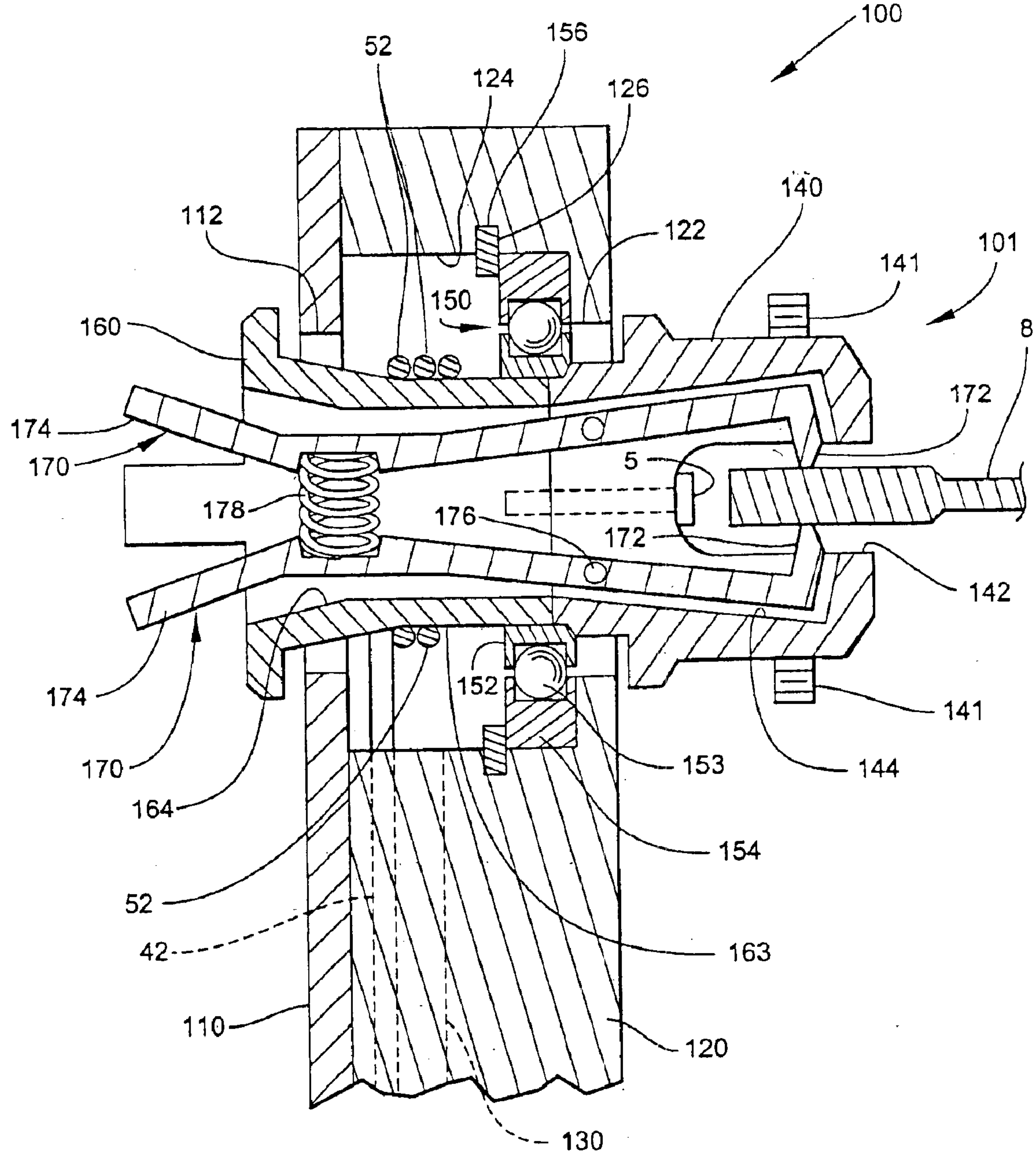
FIG. 4 is a cross-sectional view of the key unit of FIG. 3 taken along the line 4—4 of FIG. 1 and mounted on the key.
Figure 5:
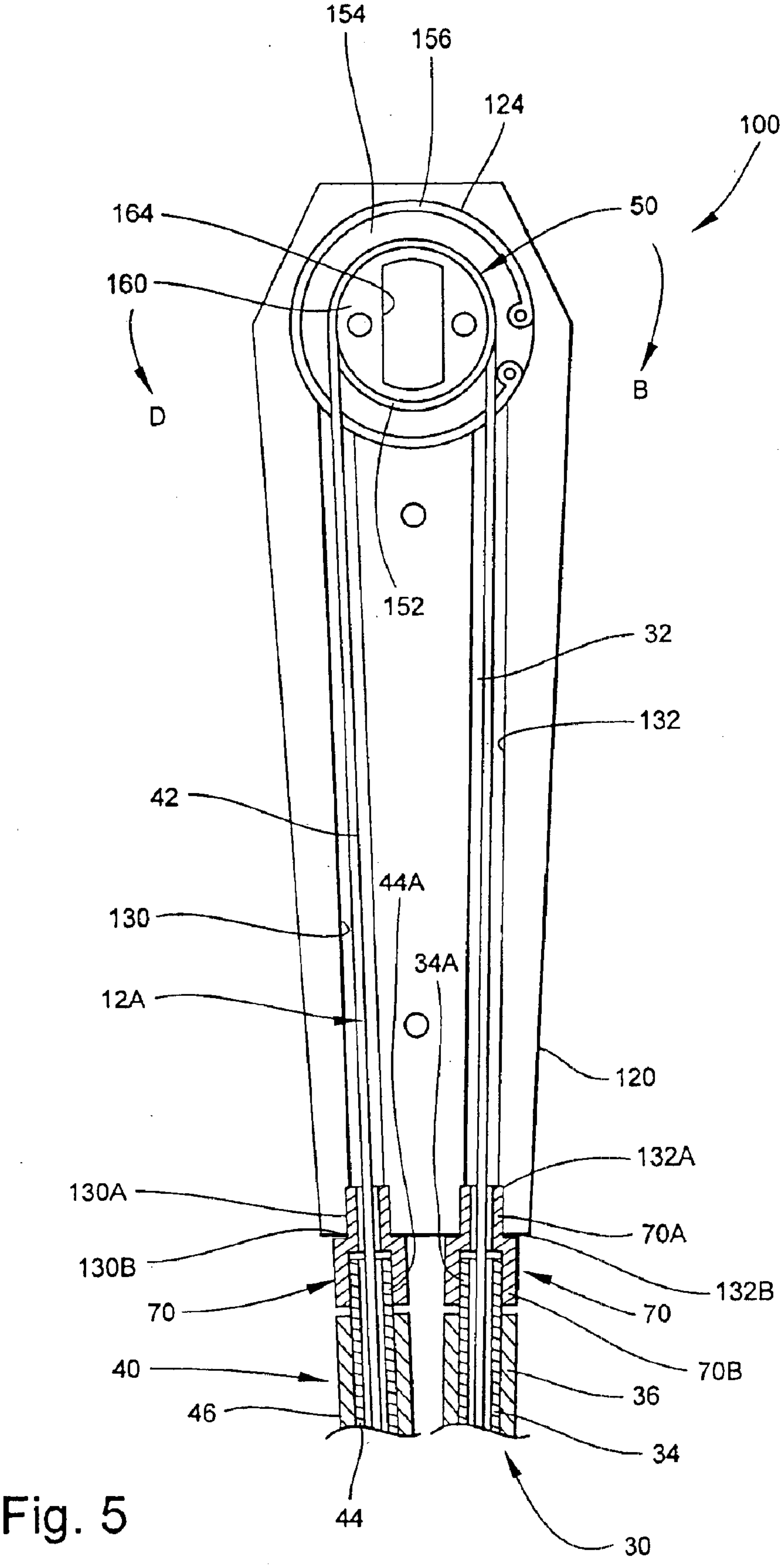
FIG. 5 is a rear, plan, fragmentary view of the key unit with portions thereof removed or sectioned for clarity.

Turning to the key unit 100 in greater detail and with reference to FIGS. 3–5, the key unit 100 includes a housing 102. The housing 102 has housing parts 110 and 120 (housing part 110 is omitted from FIG. 5). The housing 102 is preferably sized and shaped such that it can be conveniently and effectively handheld. Preferably, the housing 102 is no more than twelve inches long. The housing parts 110 and 120 are joined by screws 5 (FIG. 1). An opening 112 (FIGS. 1 and 4) is formed in the housing part 110. An opening 122 (FIG. 4), a bore 124 (FIGS. 4 and 5) and a pair of channels 130, 132 (FIGS. 4 and 5) are formed in the housing part 120. The channels 130, 132 communicate with the bore 124 and respective end openings 130B, 132B. The channels 130, 132 have respective enlarged portions 130A, 132A adjacent the openings 130B, 132B. The housing parts 110, 120 may be formed of any suitable material, and are preferably formed of metal, more preferably aluminum.

An optional counterweight/handle rod 104 extends from the housing 104. The counterweight/handle rod 104 may be formed of any suitable material such as steel or lead.

The engagement assembly 101 includes a head member 140 (not shown in FIG. 5) extending through the opening 122 and a base member 160 extending through the opening 112 and into the bore 124. The base member 160 includes a cylindrical shaft portion 163. The members 140 and 160 are joined by screws 5 (only one of which is shown in FIG. 4). The members 140, 160 are preferably formed of metal, more preferably aluminum.

A bearing assembly 150, preferably a ball bearing assembly as shown, is mounted in the bore 124. The bearing assembly 150 includes an outer race 154 fixedly mounted with respect to the housing part 120 by a circlip 156, which is received in a groove 126 in the housing part 120. Balls 153 are captured between the outer race 154 and the inner, rotatable race 152. The head member 140 and the base member 160 are secured (e.g., via friction fit, adhesive, welding or suitable fastener(s)) to the inner race 152 for rotation therewith.

The head member 140 has a slot 142 defined therein and adapted to receive the key 8. The head member 140 also defines a passage 144 communicating with the slot 142 as well as a passage 164 defined in the base member 160. A pair of clamp arms 170 extend through the passages 144, 164. Each clamp arm 170 has a jaw portion 172 and a lever portion 174 and is pivotable with respect to the head member 140 about a respective pivot pin 176. A spring 178 biases the jaws 172 into a closed (i.e., converged) position to securely grip the key 8. The jaws 172 can be opened to receive or release the key 8 by pressing the lever portions 174 toward one another. Alternatively or additionally, set screws 141 extending laterally through the head member 140 may be screwed into the slot 142 to grasp the key 8. The head member 140, clamp arms 170, pivot pins 176, spring 178, and set screws 141 are removed from the unit 100 in FIG. 5 for clarity.

Figure 6:
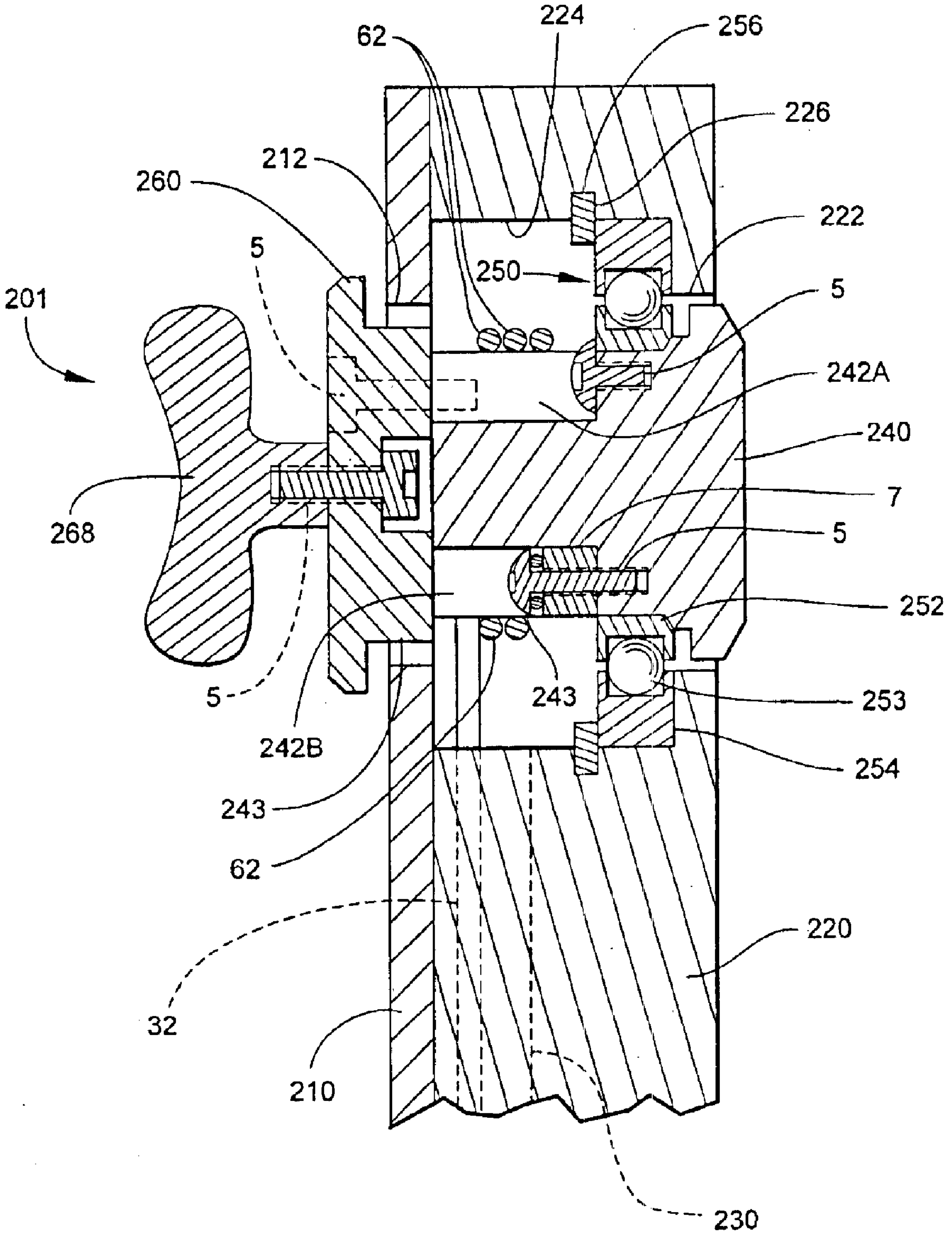
FIG. 6 is a cross-sectional view of an operator unit of the tool of FIG. 1 taken along the line 6—6 of FIG. 1.
Figure 7:
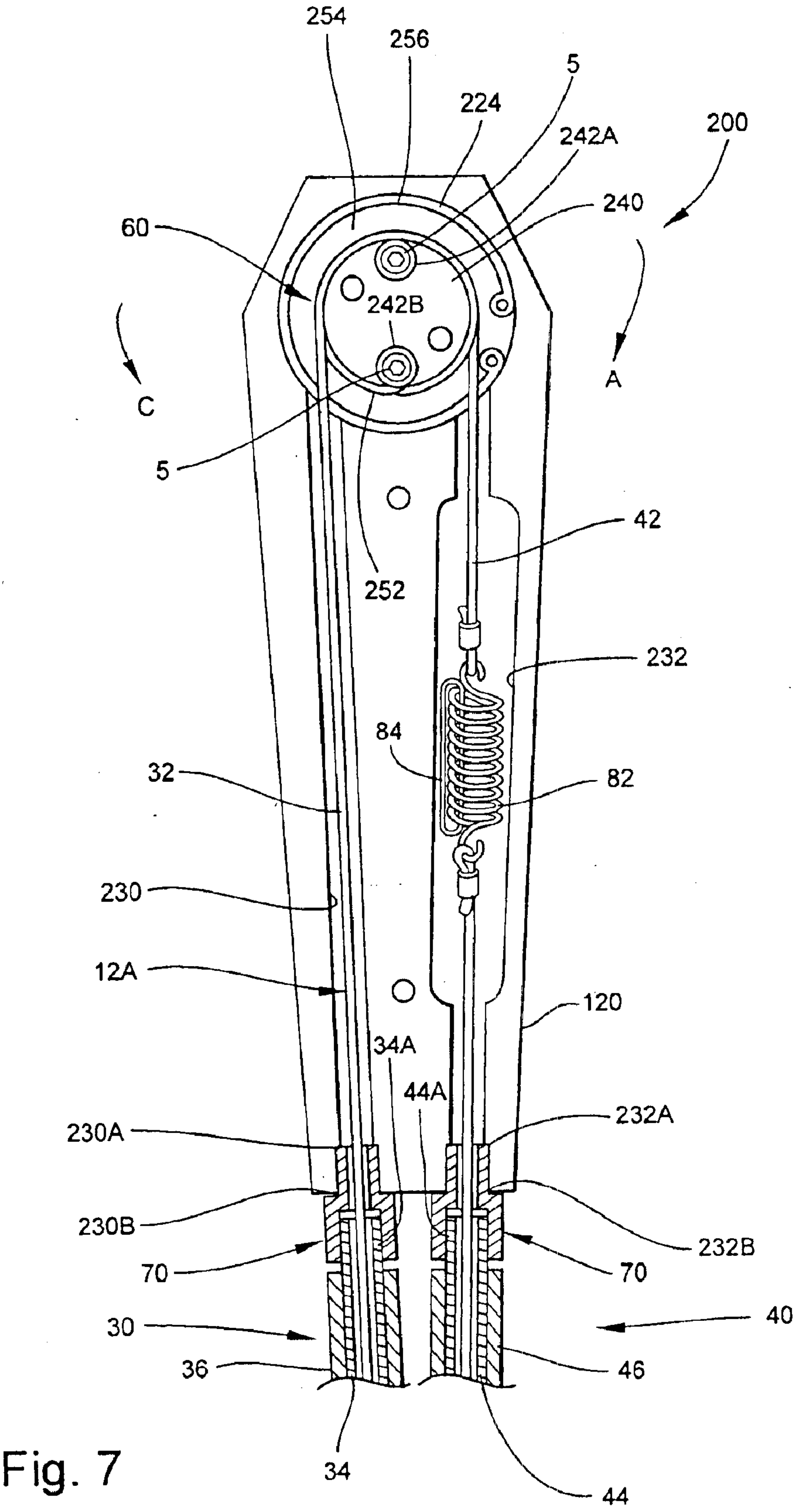
FIG. 7 is a front, plan, fragmentary view of the operator unit with portions thereof removed or sectioned for clarity.

Turning to the operator unit 200 in more detail and with reference to FIGS. 1, 6 and 7, the operator unit 200 includes a housing 202 (FIG. 1). The housing 202 includes housing parts 210 and 220. The housing 202 is preferably sized and shaped such that it can be conveniently and effectively handheld. Preferably, the housing 202 is no more than twelve inches long. The housing parts 210 and 220 are joined by screws 5 (FIG. 1). An opening 212 (FIG. 6) is formed in the housing part 210. An opening 222 (FIG. 6), a bore 224 (FIGS. 6 and 7), and a pair of channels 230, 232 (FIGS. 6 and 7) are formed in the housing part 220. The channels 230, 232 communicate with the bore 224 and respective end openings 230B, 232B. The channels 230, 232 have respective enlarged portions 230A, 232A adjacent the openings 230B, 232B. The housing parts 210, 220 may be formed of the same suitable and preferred materials as described above with regard to the housing parts 110, 120.

The control assembly 201 includes a base member 240 extending through the opening 222 and a face member 260 extending through the opening 212 and into the bore 224. The face member 260 includes a cylindrical shaft portion 243. The members 240, 260 are joined by screws (only one shown in FIG. 6). The members 240, 260 are preferably formed of metal, more preferably aluminum. The face member 260 and the knob 268 are removed from the unit 200 in FIG. 6 for clarity.

A bearing assembly 250, preferably corresponding to the bearing assembly 150, is mounted in the bore 224. The outer race 254 is fixedly mounted with respect to the housing part 220 by a circlip 256 which is received in a groove 226 in the housing part 220. The balls 253 are captured between the outer race 254 and the inner, rotatable race 252. The base member 240 is secured (e.g., via friction fit, adhesive, welding or suitable fastener(s)) to the inner race 252 for rotation therewith. The ergonomic knob 268 is affixed to the face member 260 by a screw 5 such that the knob 268, the base member 240, the face member 260 and the inner race 252 are rotatable as a unit relative to the housing 202.

Turning to the cable system 12 in more detail and with reference to FIGS. 5 and 7, the cable assemblies 30, 40 are preferably of multi-layer construction as shown and described below. The cable assemblies 30, 40 are sectioned in FIGS. 5 and 7 for the purpose of explanation. One or more bands 76 (FIG. 1) may be provided to hold the cable assemblies 30, 40 together. The cable assembly 30 includes a cable segment 32, a spacer sheath 34 and a cover sheath 36. The cable segment 32, the sheath 34 and the sheath 36 are each flexible. The cable segment 32 is preferably formed of multiple, twisted metal wires, but may be formed of any suitable material and construction (e., string). Preferably, the spacer sheath 34 defines a passage through which the cable segment 32 can freely slide. Preferably, the passage of the spacer sheath 34 is radially rigid to prevent or resist collapse of the passage. The spacer sheath 34, while being laterally flexible, is preferably substantially longitudinally fixed or incompressible. Preferably, the spacer sheath is formed of a wound metal wire. Preferably, the spacer sheath 34 has a length of at least 5 feet, more preferably of between about 8 and 16 feet, and most preferably of between about 10 and 11 feet. The cover sheath 36 is preferably formed of a flexible polymeric material, more preferably a plastic or rubber covering, to protect surfaces (e.g., the automobile) from damage. The cable assembly 40 includes a cable segment 42, a spacer sheath 44 and a cover sheath 46 corresponding to the cable segment 32, the sheath 34 and the sheath 36, respectively.

The cable segments 32 and 42 extend through the openings 130B and 132B and the channels 130 and 132, respectively, of the key unit 100 as shown in FIG. 5. A cable loop segment 50 connects the cable segments 32, 42 to one another. The cable loop segment 50 includes a plurality of loops 52 as shown in FIG. 4 wound or helically wrapped about the shaft portion 163. Preferably, as discussed below, the loops 52 are not fastened to the shaft portion 163 or the engagement assembly 101.

Rigid grommets 70 are provided having reduced portions 70A mounted in the enlarged channel portions 130A, 132A of the housing part 120. Enlarged portions 70B receive the ends 34A, 44A of the spacer sheaths 34, 44 as well as the cable segments 32, 42. In this manner, the sheaths 34, 44 are braced against the housing 102.

The cable assemblies 30, 40 are similarly connected to the operator unit 200. More particularly, the cable segments 32, 42 extend through the grommets 70 (which also receive the remaining ends 34A, 44A of the spacer sheaths 34, 44 to thereby brace the sheaths 34, 44 against the housing 202) and through the channels 230 and 232, respectively. A cable loop segment 60 joins the cable segments 32, 42 and includes a plurality of loops 62 as shown in FIG. 6. One of the loops 62 is fixedly captured between a screw 243 and a spacer 7 in a recess 242B of the base member 240.

An in-line spring 82 is positioned in the cable segment 42 in the channel 232 such that, when a prescribed tension in the cable segment 42 is exceeded, the spring 82 will stretch. The spring is preferably selected such that it is partially stretched to maintain a moderate tension in the cable segment 42 during normal operation. A clip or limiting wire loop (e, of wire or the like) 84 extends through and about the spring 82 to limit the ultimate extension of the spring 82.

The cable system 12 operatively connects the engagement assembly 101 and the control assembly 201 as follows. When the knob 268 and thus the member 240 are rotated in a clockwise direction A (FIG. 7) relative to the housing 202, a portion of the cable segment 32 is pulled into the housing 202. The spacer sheath 34 serves as a spacer between the housings 102 and 202 so that the cable segment 32 is correspondingly pulled out of the housing 102. As a result, the cable segment 32, via the frictional engagement between the loop segment 50 and the shaft portion 163, rotates the member 140 in a clockwise direction B (FIG. 5) relative to the housing 102. Likewise, rotation of the knob 268 in a counterclockwise direction C (FIG. 7) relative to the housing 202 pulls the cable segment 42 into the housing 202 and out of the housing 102, thereby rotating the member 160 in a counterclockwise direction D (FIG. 5) relative to the housing 102. In addition to the pulling forces, the rotation of the member 160 may be enabled or facilitated by the pushing of the other cable segment 32 or 42.

Preferably, and as shown, the cable segments 32, 42, 50 and 60 each form a part of a continuous common cable 12A (FIGS. 5 and 7). It will be appreciated from the foregoing description that, while the cable segments 32, 42 and the cable loop segments 50, 60 are identified in the described and illustrated embodiments, they translate or shift from one category to another as the tool 10 is operated. That is, as the knob 268 is rotated in the direction A, a portion of the loop segment 60 will become part of the cable segment 30, a portion of the cable segment 32 will become part of the loop segment 50, a portion of the loop segment 50 will become part of the cable segment 42, and a portion of the cable segment 42 will become part of the loop segment 60. When the knob 268 is rotated in the opposite direction, the reverse shifting will occur. The cable 12A may be continuously formed or may include a plurality of separate cable segments joined (e.g., by splicing, clamping, welding or the like) to form a continuous, fabricated cable.

The loop segment 50 and the shaft portion 163 may cooperate to serve as a clutch or torque transfer limiting mechanism. That is, because the loop segment 50 is not fastened to the engagement assembly 101, up to a certain tension in either cable segment 32, 42 the loop segment 50 will grip or frictionally hold the shaft portion 163 to exert rotational force on the engagement assembly 101. However, once a prescribed rotational force is exceeded, the loop segment 50 will slip relative to the shaft portion 163, thereby effectively preventing a deliberate or inadvertent excessive rotational force or cable tension that may damage the key 8, the automobile 2, or the tool 10.

The tool 10 may be used by mounting the key unit 100 on the key 8 as discussed above and as illustrated in FIG. 3, for example. The cable system 12 is routed to a remote location. The operator may then rotate the key 8 in either direction in the manner described above by rotating the knob 268 in the corresponding direction relative to the housing 202. The weight of the non-rotated parts of the key unit 101 (i.e., the portions of the key unit 101 other than engagement assembly 101) counteract the rotation of the engagement assembly 101 so that the rotational driving force of the engagement assembly 101 is directed to the key 8. Preferably, the key unit (including the counterweight 104) other than the engagement assembly 101 weighs at least 0.75 pound, more preferably at least 1.25 pounds, and most preferably between about 1.5 and 2.5 pounds. The counterweight/handle rod 104 (FIG. 1) may be used to stabilize the unit 100. A magnet 204 may be affixed to the housing 202 for temporarily securing the unit 200 to a suitable metal surface or object (e.g., automobile hood or underside, lift, etc.).

The tool 10 may provide a number of advantages. The tool 10 is simple and convenient to use. Because rotation in each direction is effected by pulling one of the cable segments 32, 42, the tool 10 may allow precise and sensitive control of the key 8. The tool 10 may provide high durability. The cable assemblies 30, 40 may be of substantially any suitable length while nonetheless maintaining consistent and positive control.

The tool 10 may be further provided with cable tension adjustment means. For example, the grommets 70 may be threaded into the housing parts 102, 202 such that the distance between the housings 120, 220 can be adjusted by screwing the grommets 70 in or out.

The tool 10 may be further provided with an electrical jumper extending from the key unit 100 to the operator unit 200. The key unit 100 may include an electrical connector adapted to engage an automobile cigarette lighter socket or other power connector, for example, thereby allowing the operator to source or test the power provided at the socket.

Other structures or components to grasp the key 8 with the engagement assembly 101 may be provided. Moreover, the head member 140 and other portions of the engagement assembly 101 may be adapted to be removed and replaced with such other components. For example, the head member 140 may be interchangeable such that it can be replaced with a replacement head member that is differently configured. The replacement head member may be adapted to hold the key 8 in a different manner and/or may be adapted to grasp a key of a different configuration and/or size than the key 8.

The tool 10 may be modified to eliminate one or both of the cable loop segments 50, 60. For example, the ends of the cable segments 32, 42 may be anchored (e.g., with fasteners, welds, or adhesive) to the shaft portions 163, 243 such that the cable segments are pushed or pulled in the manner described above as the assemblies 101, 201 are rotated.

The control assembly 201 may be replaced with other components to pull the cable segments 32, 42, such as a lever and pulleys suitably arranged.

The cable 12A may be replaced with multiple, separate cables. "Cable segment" as used herein does not require that the cable including the cable segment include any further cable portion or segment. That is, the referenced cable segment may constitute the entirety of a cable.

The control assembly 101 and the engagement assembly 201 as discussed above each include multiple, joined components. However, the assemblies 101, 201 may each be formed of fewer components and may even be unitarily formed in accordance with embodiments of the present invention. "Control assembly" and "engagement assembly" as used herein are intended to include all such embodiments.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A tool for remotely turning a key, the tool comprising:

a) a key unit including an engagement assembly adapted to engage the key;

b) an operator unit including a control assembly; and c) at least one cable segment linking the key unit and the operator unit such that the engagement assembly can be mechanically rotated via the cable segment by manipulation of the control assembly to thereby rotate the key when the key is engaged by the engagement assembly;

d) wherein the control assembly includes a rotatable knob and the tool is operative to rotate the engagement assembly responsive to rotation of the rotatable knob.

2. The tool of claim 1 wherein:

the at least one cable segment includes first and second cable segments linking the key unit and the operator unit such that the engagement assembly can be mechanically rotated via the first and second cable segments by manipulation of the control assembly to thereby selectively rotate the key when the key is engaged by the engagement assembly in each of a first rotative direction and a second rotative direction; and the first and second cable segments are connected to the engagement assembly and the control assembly such that the first cable segment is pulled when the control assembly is operated to rotate the engagement assembly in the first rotative direction and the second cable segment is pulled when the control assembly is operated to rotate the engagement assembly in the second rotative direction.

3. The tool of claim 1 wherein the cable segment is pulled when the control assembly is operated to rotate the engagement assembly.

4. The tool of claim 1 wherein the engagement assembly includes at least one set screw adapted to frictionally engage and hold the key.

5. The tool of claim 4 including first and second set screws each adapted to frictionally engage and hold the key.

6. The tool of claim 5 wherein the first and second set screws are adapted to engage opposed sides of the key.

7. A tool for remotely turning a key, the tool comprising:

a) a key unit including a key unit housing and an engagement assembly adapted to engage the key, the engagement assembly being rotatably mounted in the key unit housing;

b) an operator unit including a control assembly; and c) at least one cable segment linking the key unit and the operator unit such that the engagement assembly can be mechanically rotated via the cable segment by manipulation of the control assembly to thereby rotate the key when the key is engaged by the engagement assembly.

8. The tool of claim 7 wherein the engagement assembly includes a rotatable head and a slot formed in the head, the slot being adapted to receive the key.

9. The tool of claim 7 including a counterweight extending from the key unit housing to stabilize the key unit.

10. The tool of claim 7 including a bearing operably mounted in the key unit housing between the key unit housing and the engagement assembly.

11. The tool of claim 7 wherein at least a portion of the engagement assembly adapted to engage the key is adapted to be removed and replaced with a replacement portion adapted to engage the key and/or a further key.

12. A tool for remotely turning a key, the tool comprising:

a) a key unit including an engagement assembly adapted to engage the key;

b) an operator unit including a control assembly;

c) at least one cable segment linking the key unit and the operator unit such that the engagement assembly can be mechanically rotated via the cable segment by manipulation of the control assembly to thereby rotate the key when the key is engaged by the engagement assembly; and d) an inline spring connected to the cable segment to maintain a tension in the cable segment, wherein the spring is positioned in the cable segment between opposed ends of the cable segment.

13. The tool of claim 12 wherein the cable segment is pulled when the control assembly is operated to rotate the engagement assembly.

14. A tool for remotely turning a key, the tool comprising:

a) a key unit including an engagement assembly adapted to engage the key;

b) an operator unit including a control assembly;

c) at least one cable segment linking the key unit and the operator unit such that the engagement assembly can be mechanically rotated via the cable segment by manipulation of the control assembly to thereby rotate the key when the key is engaged by the engagement assembly; and d) a clutch mechanism adapted to limit the maximum load that can be applied to the key by the tool.

15. The tool of claim 14 wherein the clutch mechanism is a slippable clutch mechanism.

16. The tool of claim 14 wherein the cable segment is pulled when the control assembly is operated to rotate the engagement assembly.

* * * * *